(12) United States Patent
Krause et al.

(10) Patent No.: US 7,757,373 B2
(45) Date of Patent: Jul. 20, 2010

(54) METHOD AND TOOL HEAD FOR MACHINING OPTICALLY ACTIVE SURFACES, PARTICULARLY SURFACES OF PROGRESSIVE SPECTACLE LENSES, WHICH ARE SYMMETRICAL IN PAIRS

(75) Inventors: Wolf Krause, Essingen (DE); Andreas Bielke, Steinheim (DE)

(73) Assignee: Carl Zeiss Vision GmbH, Aalen (DE)

( * ) Notice: Subject to any disclaimer, the term of this patent is extended or adjusted under 35 U.S.C. 154(b) by 71 days.

(21) Appl. No.: 12/259,498

(22) Filed: Oct. 28, 2008

(65) Prior Publication Data

US 2009/0113694 A1 May 7, 2009

Related U.S. Application Data

(60) Division of application No. 11/480,213, filed on Jun. 30, 2006, now abandoned, which is a continuation of application No. PCT/EP2005/000412, filed on Jan. 18, 2005.

(30) Foreign Application Priority Data

Jan. 19, 2004 (DE) .................... 10 2004 003 583

(51) Int. Cl.
| | |
|---|---|
| *B23P 23/00* | (2006.01) |
| *B23C 3/04* | (2006.01) |
| *B23B 1/00* | (2006.01) |
| *B23B 5/00* | (2006.01) |

(52) U.S. Cl. .............................. 29/558; 29/27 C; 29/50; 82/1.11; 409/132

(58) Field of Classification Search .................. 29/558, 29/557, 27 C, 27 R, 50, 566; 82/1.11; 409/132, 409/131, 165–166; 451/43, 44, 251, 255, 451/256, 42, 41

See application file for complete search history.

(56) References Cited

U.S. PATENT DOCUMENTS

| 4,040,156 A | 8/1977 | Tack |
| 4,203,259 A * | 5/1980 | Haddock ..................... 451/256 |

(Continued)

FOREIGN PATENT DOCUMENTS

DE 37 33 298 A1 4/1989

(Continued)

*Primary Examiner*—Erica E Cadugan
(74) *Attorney, Agent, or Firm*—Harness, Dickey & Pierce, P.L.C.

(57) ABSTRACT

A method and a tool head are provided for the chip-removingly machining of pairwise symmetrical, optically effective surfaces, in particular of surfaces of progressive power spectacle lenses. The spectacle lenses are rotated about a first axis and are displaced along the axis. Further, a chip-removing tool is provided being positioned and being adapted to be fed-in, such that a cutting edge of the tool is guided over the surface along a spiralled path and along an elevation function given by the shape of the spectacle lens, when the latter is rotated about the first axis. For machining right side spectacle lenses and left side spectacle lenses, the right side spectacle lenses are rotated about the first axis in a first rotational direction, and the left side spectacle lenses are rotated about the first axis in a second rotational direction opposite the first rotational direction. The tool head comprises a chucking structure defining an axis of the tool head, and a tool carrier section having at least two lathing tools arranged at a periphery thereof. The one lathing tool of the pair is oriented in the one circumferential direction of the periphery, and the other lathing tool of the pair is oriented in the opposite circumferential direction of the periphery. At least one, preferably all of the lathing tools are provided with an adjustment device allowing an adjustment of a point of engagement of the lathing cutting edge.

18 Claims, 4 Drawing Sheets

U.S. PATENT DOCUMENTS

| | | |
|---|---|---|
| 5,217,330 A | 6/1993 | Dennstedt |
| 5,735,649 A | 4/1998 | Boscarino et al. |
| 5,967,705 A | 10/1999 | Wermeister |
| 6,865,789 B2 | 3/2005 | Katoh et al. |
| 6,901,642 B2 | 6/2005 | Rydberg |
| 6,991,525 B2 | 1/2006 | Diehl et al. |
| 7,037,051 B2 | 5/2006 | Wermeister |
| 7,121,176 B2 | 10/2006 | Pinger et al. |
| 2001/0051490 A1* | 12/2001 | Siders et al. .......... 451/44 |
| 2003/0167613 A1 | 9/2003 | Rydberg |
| 2004/0177491 A1 | 9/2004 | Pinger et al. |

FOREIGN PATENT DOCUMENTS

| | | |
|---|---|---|
| DE | 195 25 310 A1 | 12/1995 |
| DE | 198 57 841 A1 | 6/2000 |
| DE | 101 43 848 A1 | 3/2003 |

* cited by examiner

METHOD AND TOOL HEAD FOR MACHINING OPTICALLY ACTIVE SURFACES, PARTICULARLY SURFACES OF PROGRESSIVE SPECTACLE LENSES, WHICH ARE SYMMETRICAL IN PAIRS

CROSSREFERENCES TO RELATED APPLICATIONS

This application is a divisional of U.S. Ser. No. 11/480,213, filed Jun. 30, 2006, now abandoned, which is a continuation of international patent application PCT/EP2005/000412 filed on Jan. 18, 2005 and published in German language as WO 2005/068120, which international patent application claims priority from German patent application 10 2004 003 583.0, filed Jan. 19, 2004.

FIELD OF THE INVENTION

The invention, generally, is related to the field of manufacturing optically effective surfaces of, for example, lenses and mirrors and to tool heads used for carrying out the method.

More specifically, the invention is related to the field of machining pairwise symmetrical, optically effective surfaces by chip-removing, in particular by lathing and/or milling and/or grinding.

Still more specifically, the invention is related to a method for the chip-removingly machining of pairwise symmetrical, optically effective surfaces, in particular of surfaces of progressive power spectacle lenses, wherein the spectacle lenses are rotated about a first axis and are displaced along the axis, a chip-removing tool being provided, the tool being positioned and being adapted to be fed in, such that a cutting edge of the tool is guided over the surface along a spiralled path and along an elevation function given by the shape of the spectacle lens, when the spectacle lens is rotated about the first axis.

The invention, further, is related to a tool head for the chip-removingly machining of pairwise symmetrical, optically effective surfaces, in particular of surfaces of progressive power spectacle lenses, comprising chucking means defining an axis of the tool head, and a tool carrier section having at least two lathing tools arranged at a periphery thereof, being each provided with a lathing cutting edge.

Still more specifically, the invention, insofar, is related to a tool head for the chip-removingly machining of pairwise symmetrical, optically effective surfaces, in particular of surfaces of progressive power spectacle lenses, comprising chucking means defining an axis of the tool head, and a tool carrier section having at least two lathing tools arranged at a periphery thereof.

BACKGROUND OF THE INVENTION

In the context of the present application the term "pairwise symmetrical, optically effective surfaces" encompasses all such surfaces, i.e. not only the progressive power spectacle lenses already mentioned as an example. Instead, the invention may be used for all applications on optically effective surfaces being used in pairs, for example for lenses and mirrors as are used in binocular applications, e.g. telescopes, microscopes, and the like.

U.S. Pat. No. 6,991,525 describes a method and a tool head of the type specified at the outset. This prior art method uses a tool head having an essentially tapered main body. The main body axis coincides with the tool head axis of rotation. The larger terminal plane of the main body lies at the free end of the tool head. Two equal lathing tools being offset relative to one another by 180° are located at the periphery of the larger terminal plane and are equally oriented in a circumferential direction of the periphery. Further, there are eight milling tools distributed along the periphery. The cutting edges of all these tools are rigidly bolted at their respective positions. No means for adjusting the position of the cutting edges are provided.

The spectacle lens to be machined is positioned in a holder being chucked in a work piece spindle. The work piece spindle rotates the spectacle lens about a first axis and is further adapted to be displaced along that first axis. The tool head is chucked in a tool spindle having a second axis which is inclined relative to the first axis of the work piece spindle. The tool is adapted to be rotated about the second axis at a high rotary speed. The tool spindle, further, is adapted to be displaced along a third axis extending perpendicular to the first axis.

For machining the spectacle lens one proceeds in two steps. Firstly, in a first operating step the substantially major portion of the overmeasure of a spectacle lens blank is removed by milling. Secondly, in a second operating step the fine machining and the shaping of the surface is effected so as to generate the desired optical plane, for example a prescription plane. Subsequently, the spectacle lens may be polished or otherwise coated, as known per se.

For effecting the first operational step, the tool head is brought into rotation about the second axis. By displacing the spectacle lens along the first axis and by displacing the work piece spindle along the third axis, a point of engagement of the milling tool at the periphery of the surface to be machined is set. The spectacle lens is rotated about the first axis in a predetermined direction of rotation, and the tool head is displaced continuously along the third axis, such that the point of engagement moves along a narrow spiralled path on the surface towards a central point. The material is, thereby, removed by milling. By superimposing a movement of the spectacle lens along the first axis, a coarse convex or concave shaping may be effected simultaneously, which, however, is not the exact shaping of the desired free-form surface.

For the second operational step the tool head is rotated only once about a finite angle until a point of engagement of a lathing tool is at a desired peripheral position, whereafter it is rotated no more. The spectacle lens is now again rotated about the first axis in a predetermined direction of rotation, and the tool head is continuously displaced along the third axis such that the point of engagement again moves along a narrow spiralled path on the surface towards the center point thereof. The material is now removed by lathing. In this second operational step an elevation function along the spiralled path is set by superimposing a movement of the spectacle lens along the first axis. The elevation function corresponds to the desired free-form shape of the optical surface.

Now, during the manufacture of such spectacle lenses, the free-form surfaces for the right side and for the left side lens of equal optical powers are essentially mirror-symmetrical. In conventional manufacturing processes, the machining of all spectacle lenses, i.e. the right side lenses as well as the left hand lenses, is effected within the same apparatus as described before, and is effected in the same manner, i.e. always along the same direction of rotation of the spectacle lens about the first axis.

During the chip-removingly machining of spectacle lenses one is always confronted with inherent form defects because the machining system, consisting of spindles, mounts, etc., is elastic, and, therefore, due to inertial forces exerted by moved elements, positioning errors occur during changes in position.

This holds true in particular for the setting of the elevation function. The spectacle lenses, namely, are rotated in practice at rotational speeds within such high rotational speed ranges (typically several 100 rpm) about the first axis that non-negligible form defects occur due to insufficient dynamic behaviour when the spectacle lens is simultaneously displaced along the first axis.

The machining system is non-symmetrical in the meaning that like form defects would occur with inverted sign when the same elevation function is run through in the opposite direction. During the conventional machining of spectacle lenses, as described above, this results in practice in unequal form defects for the right side and the left side spectacle lenses. This must be prevented by substantial correctional measures, i.e. by shaping lead values that are complicated to compute.

The prior art tool, further, has the disadvantage that due to the rigid arrangement of the tools on the tool head, one cannot produce defined conditions of engagement.

SUMMARY OF THE INVENTION

It is, therefore, an object underlying the invention, to improve a method and a tool head of the type specified at the outset such that the above-mentioned disadvantages are avoided. In particular, it shall become possible to manufacture right side and left side spectacle lenses more easily and without the inherently different form defects in right side and left side spectacle lenses as occur in the prior art due to the mirror-symmetrical elevation function of the free-form surfaces.

According to the method specified at the outset, this object is achieved in that for machining right side spectacle lenses and left side spectacle lenses, the right side spectacle lenses are rotated about the first axis in a first rotational direction, and the left side spectacle lenses are rotated about the first axis in a second rotational direction opposite the first rotational direction.

According to the tool head of the type specified first at the outset, this object is achieved in that at least one, preferably all of the lathing tools are provided with adjustment means allowing an adjustment of a point of engagement of the lathing cutting edge.

According to the tool head of the type specified second at the outset, this object is achieved in that at least one pair of lathing tools is provided, and that the one lathing tool of the pair is oriented in one circumferential direction of the periphery, and the other lathing tool of the pair is oriented in the opposite circumferential direction of the periphery.

The object underlying the invention is, thus, entirely solved.

If, namely, the direction of rotation about the first axis during the machining of the right side and of the left side spectacle lens is set oppositely, then the cutting edge of the tool follows the elevation function in the same direction, such that the form defects are equal in both cases, and, therefore, need to be corrected only one time, i.e. by a same shaping lead value for both spectacle lenses.

The provision of adjustment means has the advantage that the conditions for engagement are defined for several cutting edges, when, one the one hand, one machines with the first lathing tool for right side spectacle lenses in the first direction of rotation, and, on the other hand at a different moment in time one machines with the second lathing tool for left side spectacle lenses in the opposite direction of rotation.

The provision of pairs of lathing tools with opposite orientation has the advantage that by simply rotating the tool head about a certain angle one may at one time machine right side spectacle lenses and at another time left side spectacle lenses in opposite directions of rotation.

In a preferred embodiment of the invention, for the machining of right side spectacle lenses and of left side spectacle lenses of same optical power, the spectacle lenses are displaced along the first axis in the same manner.

This measure has the advantage that the sets of data for the elevation functions must be generated only once.

It is particularly preferred when, as is known per se, the chip-removing is executed by lathing, and when, preferably, further, also in a manner known per se, the spectacle lenses are pre-machined by milling prior to the lathing.

This measure has the advantage that well-known manufacturing processes and manufacturing installations may be used.

In another preferred embodiment of the invention a first lathing tool is used during the lathing of the right side spectacle lens and a second lathing tool is used during the lathing of the left side spectacle lens, wherein the lathing tools are oppositely oriented with respect to the direction of the spiralled path.

This measure has the advantage that the inventive method may be used with particularly simple tools.

In that case it is particularly preferred when the lathing tools are adjusted with respect to the position of their lathing cutting edge.

In a preferred embodiment of the inventive tool head, the adjustment means allow an adjustment of the point of engagement in the direction to the axis.

This measure has the advantage that all points of engagement may be laid into the same radial plane.

Further, the adjustment means may allow an adjustment of the point of engagement in a direction perpendicular to the axis.

In other embodiments of the invention, two pairs of lathing tools may be provided.

This measure, on the one hand, has the advantage that for different pairs of lathing tools different lenses may be machined with the same tool head, e.g. lenses of a first material may be machined with the first pair, and lenses of a second material may be machined with the second pair. On the other hand the pairs of lathing tools may be of the same design, wherein the second pair is used when the first pair is worn out or damaged, thus avoiding the need to change the tool head at that instance.

In a manner known per se, milling tools may be arranged at the periphery of the tool carrier section. In particular, the milling tools may have milling cutting edges with a point of engagement located on a cutting circle extending about the axis, and points of engagement of the lathing cutting edges are located within the cutting circle at a predetermined distance thereto.

Further advantages will become apparent from the description and the enclosed drawing.

It goes without saying that the features mentioned above and those that will be explained hereinafter may not only be used in the particularly given combination, but also in other combinations, without leaving the scope of the present invention.

BRIEF DESCRIPTION OF THE DRAWINGS

Embodiments of the invention are shown in the drawing and will be explained in further detail throughout the subsequent description.

DETAILED DESCRIPTION OF THE PREFERRED EMBODIMENTS

Figure 1:
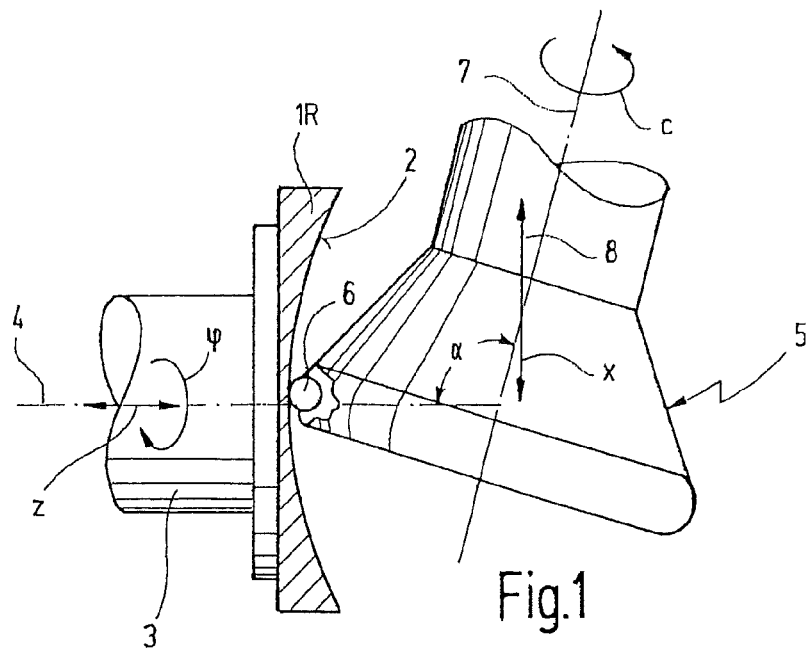
FIG. 1 shows an apparatus for machining spectacle lenses according to the prior art.

FIG. 1 shows the prior art with a spectacle lens 1 being provided with a prescription or free-form surface on a surface 2 thereof, for example on its rear surface. Spectacle lens 1 may be a right side lens 1R or a left side lens 1L.

It goes without saying that the term "pairwise symmetrical, optically effective surface", as used in the context of the present application, all such surfaces are to be understood, i.e. not only progressive power lenses already mentioned as an example. Instead, the invention may be used in all cases of optically effective surfaces used in pairs, for example lenses and mirrors for binocular applications as in telescopes, microscopes, etc. Just for the sake of descriptiveness the invention will hereinafter be explained with regard to the example of progressive power spectacle lenses, briefly referred to as "spectacle lenses".

Initially, spectacle lens 1 is held as an unmachined blank in a mounting apparatus 3 being a part of a work piece spindle. Mounting apparatus 3 is adapted to rotate about a first axis 4 by predetermined angles Φ or angular steps. Mounting apparatus 3, further, is adapted to be displaced by predetermined distances Z or linear steps along first axis 4.

A rotatable tool head 5 has a milling tool 6 in the area of its free end. Milling tool 6 is in engagement with surface 2 at a predetermined point. In practice there are several such milling tools distributed around the periphery. The milling tools, preferably, consist of a cutting edge only. Tool head 5 is adapted to be rotated about a second axis 7 at a high rotational speed of, for example, about 10,000 rpm, as indicated by an arrow C. Second axis 7, as known per se, is inclined relative to first axis 4 by an angle α of, for example, about 105°. Further, it is adapted to be displaced by predetermined distances X or linear steps along a third axis 8 extending perpendicular to first axis 4 and may also extend perpendicular to the drawing plane of FIG. 1.

By means of displacement movements Z, Φ, and X a first point of engagement of milling tool 6 at the rim of surface 2 may be set in a first operating step. Spectacle lens 1 is then rotated (Φ) in a predetermined direction of rotation by rotation about first axis 4, and tool head 5 is simultaneously fed in (X) along third axis 8. This results in a spiralled path of the point of engagement of the cutting edge of milling tool 6 with surface 2, wherein the spiralled path is set narrowly. By that milling the lens is machined down to a small overmeasure.

In a second operating step a lathing tool (not shown in FIG. 1) is brought into contact with surface 2 at a second point of engagement for the fine machining of surface 2. The lathing tool is likewise arranged on tool head 5, and is somewhat set back with regard to the cutting circle of milling tool 6. For that purpose, the lathing tool is rotated about a certain angular step until a cutting edge of the lathing tool is positioned at the predetermined second point of engagement, and then rotates no more.

By way of the same sequence of movements the cutting edge of the lathing tool is now also guided along a spiralled path over surface 2. While the cutting edge of the lathing tool moves along the spiralled path, spectacle lens 1 is, additionally, fed in continuously along first axis 4 (Z), such that an elevation function is generated corresponding to the desired shape of surface 2, for example a free-form surface.

Figure 2A:
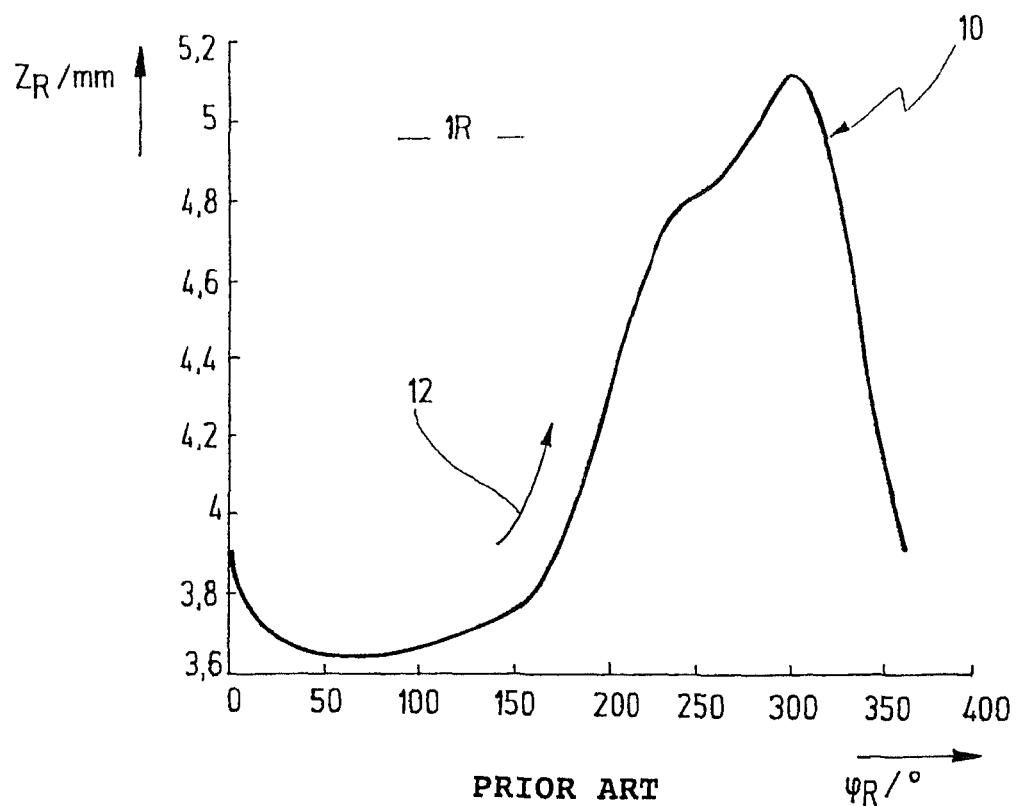
FIG. 2A shows an elevation function for one turn for a right side spectacle lens to be machined according to the prior art.

FIG. 2A shows a first elevation function 10 of the formula $Z_R=f(\Phi_R)$ for one turn and for a right side spectacle lens 1R. As one can see, elevation function 10, with the selected direction of rotation of spectacle lens 1R, is run through in a first machining direction, as symbolized by an arrow 12.

Figure 2B:
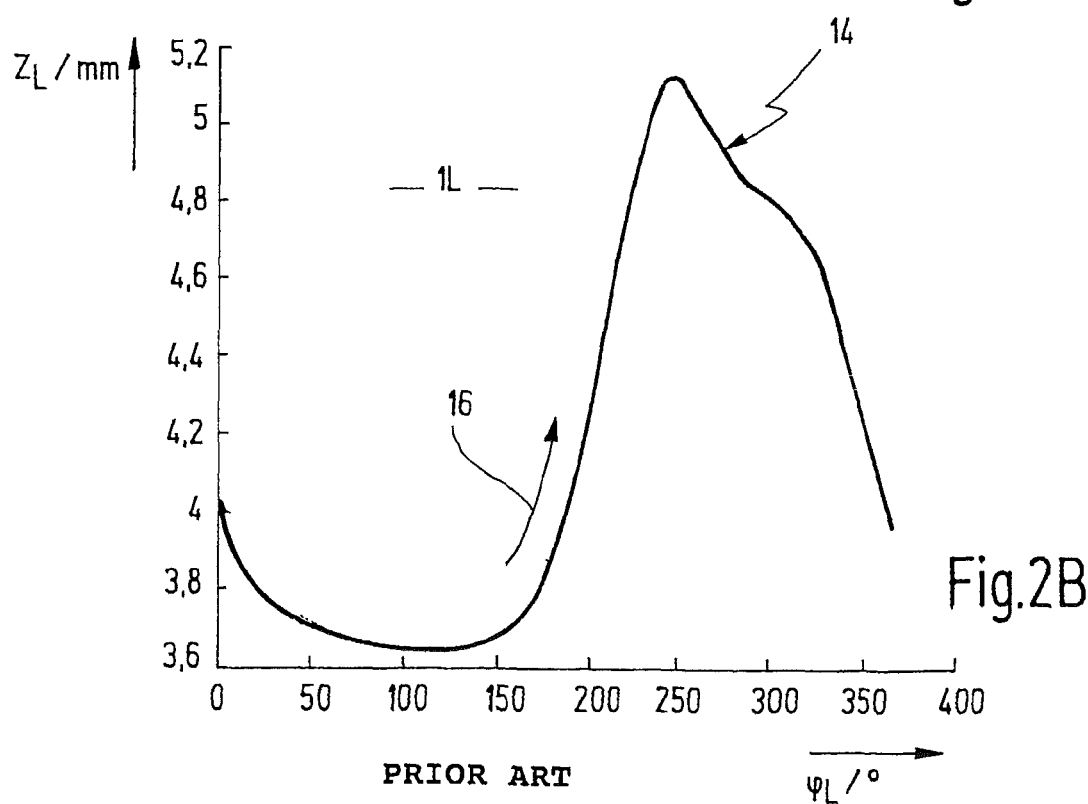
FIG. 2B shows an elevation function for one turn for a left side spectacle lens having the same optical power as that in FIG. 2A to be machined according to the prior art.

FIG. 2B shows a machining process $Z_L=f(\Phi_L)$ for a left side spectacle lens 1L of same optical power as in FIG. 2A. The elevation function 14 is essentially mirror symmetrical as compared to elevation function 10 from the right side spectacle lens. The corresponding second machining direction 16 is unaltered when the direction of rotation is likewise unaltered. As a result, in conventional machining of right side spectacle lenses 1R and left side spectacle lenses 1L of same optical power, the sections of the elevation functions 10 and 14 of different gradient are run through in opposite directions. This results in different form defects which, therefore, have to be compensated for by means of different shaping lead values. A positive gradient in a certain point of first elevation function 10, namely, effects an acceleration of the corresponding displacement unit, whereas the corresponding point on the second elevation function 14 has a negative gradient, i.e. a gradient of same absolute value but of opposite sign, which results in a deceleration of the same displacement unit. As a consequence, different form defects are generated.

Figure 3A:
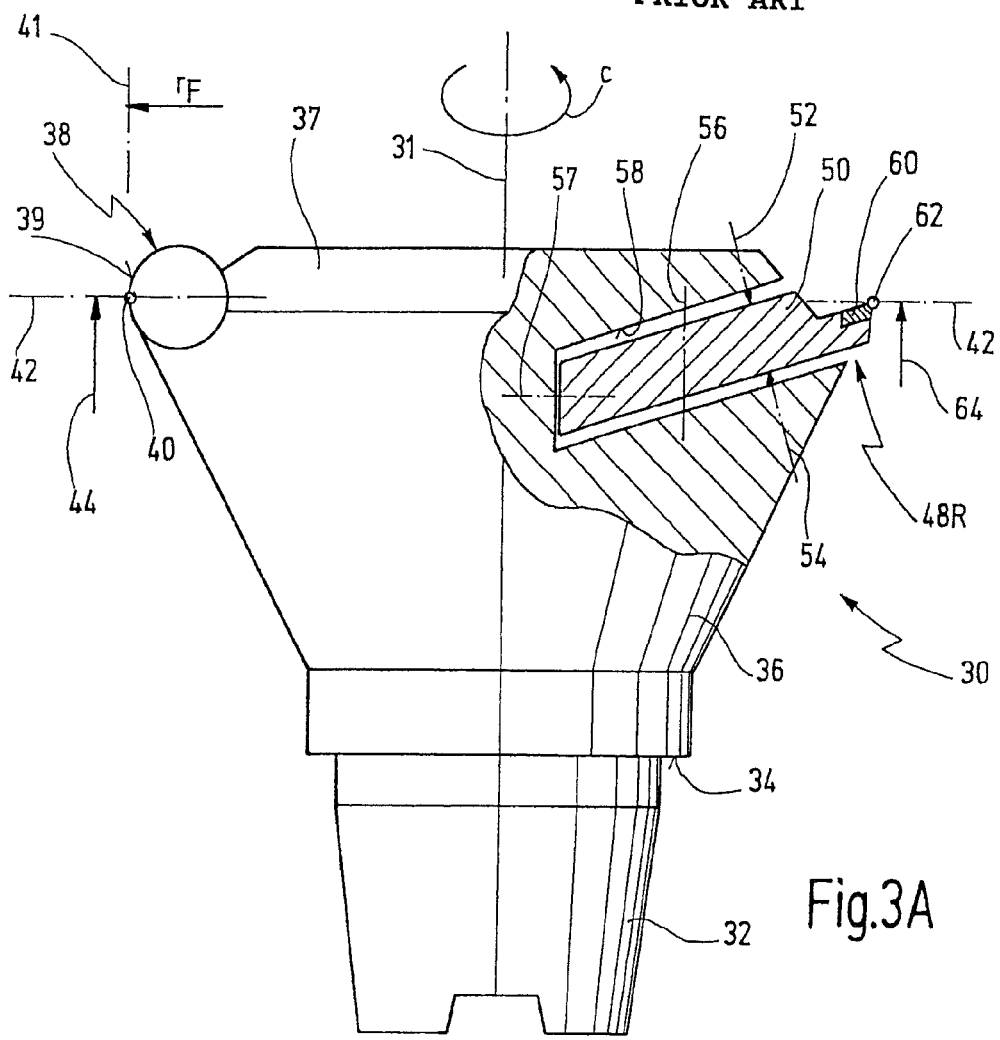
FIG. 3A shows a side elevation view, partially broken away along the line II-II of FIG. 3B, of an embodiment of a tool head according to the present invention.
Figure 3B:
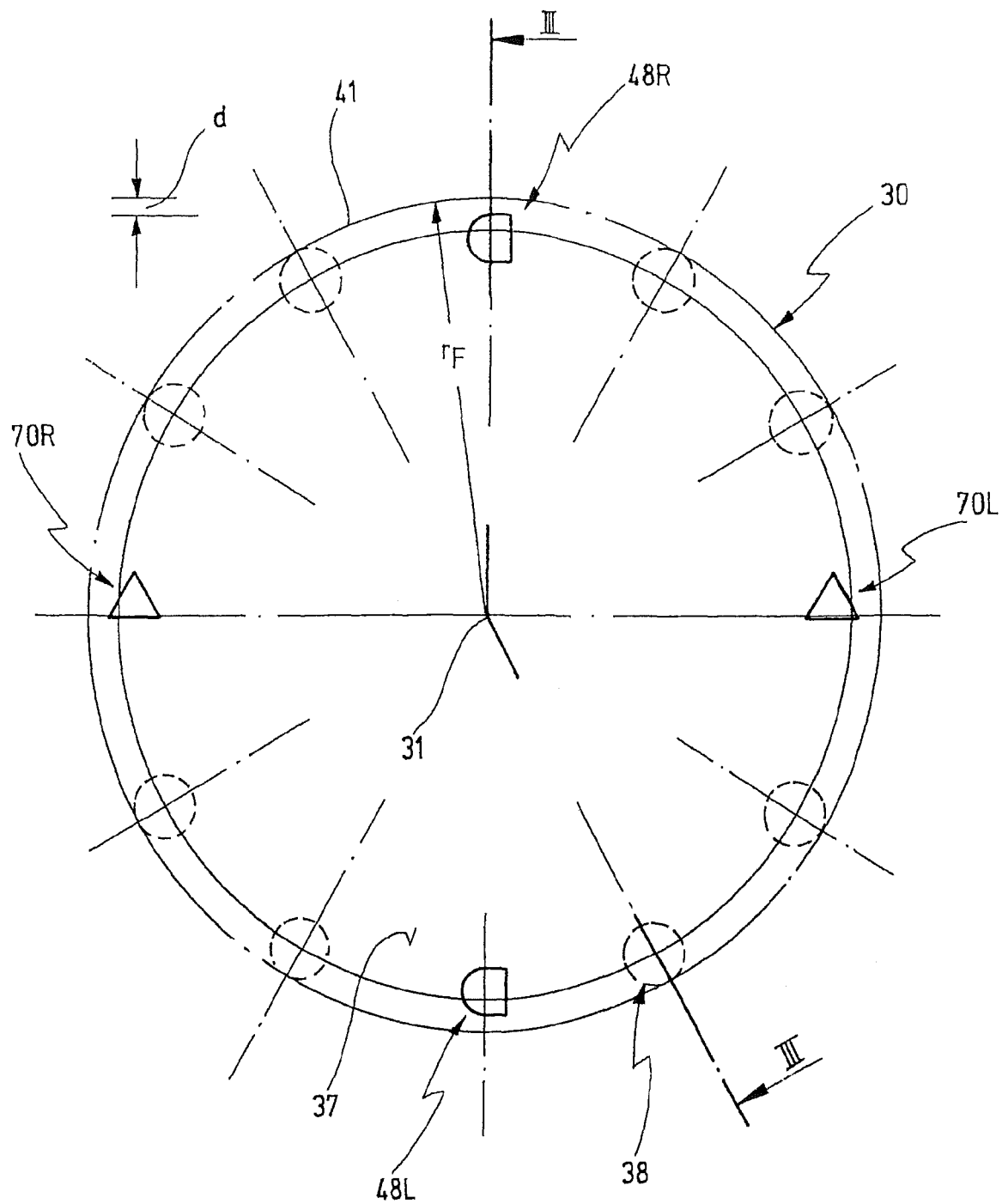
FIG. 3B shows a further schematised top plan view of the tool head of FIG. 3A.

FIGS. 3A and 3B show an embodiment of a tool head 30 according to the present invention.

Tool head 30 has an axis 31 of rotation and is provided with a chucking taper 32 having an axial stop 34. The free end of tool head 30 is configured by a tool carrier section 36, the terminal plane 37 of which carrying tools, as can best be seen in FIG. 3B. The tools, for the sake of simplicity, are shown merely as geometrical symbols which do not correspond to their actual shape. This holds likewise true for the distribution of the tools about the periphery of terminal plane 37.

On the left side of FIG. 3A on can see a circular disk shaped milling tool 38 having a milling cutting edge 39. Milling tool 38, preferably, consists of milling cutting edge 39 only. Milling cutting edge 39 has a point 40 of engagement which is located radially outwardly and at which the chip removing from surface 2 takes place. When tool head 30 rotates about axis 31 during milling, point 40 of engagement moves along a cutting circle 41 having a radius $r_F$. As shown in FIG. 3B, milling tool 38 is just one of altogether eight such tools being distributed about the periphery of terminal plane 37.

Point 40 of engagement is located within a plane 42, namely a radial plane with respect to axis 31 of rotation. Plane 42 has a predetermined axial distance, for example with regard to stop 34, as indicated by an arrow 44.

On the right side of FIG. 3A one can see a lathing tool 48R being one of two lathing tools 48R, 48L of a pair, as shown in FIG. 3B. Moreover, there is provided still another pair of lathing tools 70R, 70L.

According to FIG. 3A, lathing tool 48R comprises a lathing cutter carrier 50. Lathing cutter carrier 50 is affixed to a recess 58 of tool carrier section 36 by means of a first clamping bolt 52 and a second clamping bolt 54 being, preferably, axially flush with the latter.

Lathing cutter carrier 50, prior to be affixed, is adapted to be adjusted in its position relative to tool carrier section 36 by means of adjustment bolts 56 and 57. Adjustment bolt 56 extends parallel to axis 31, such that lathing cutter carrier 50 is adapted to be thereby affixed axially. By doing so, a lathing cutting edge 60 at the free end of lathing cutter carrier 50 may be adjusted such that its point 62 of engagement comes to lie exactly within a predetermined plane, for example within plane 42, as indicated by an arrow 64.

In addition, a radial adjustment option for lathing cutter carrier 50 may be provided by means of the second adjustment bolt 57. Further adjustment bolt 57 makes sense when the radial positioning of point 62 of engagement is not already set by the manufacturer's grinding of lathing cutting edge 60.

In any event, point 62 of engagement of lathing cutting edge 60 lies within cutting circle 41 of milling tool 38 at a distance d thereto, as clearly shown in FIG. 3B. Then lathing tools 48, 70 are out of engagement when milling tools 38 are in engagement. For bringing one of lathing tools 48 or 70 into engagement for subsequent lathing, tool carrier 30 is rotated just by a certain angle corresponding to the desired point of engagement. In that position tool head 30 is guided along the elevation function of the spectacle lens.

Insofar it is preferred, as already mentioned, to provide on the periphery of the cutting edge carrier section two lathing tools 48R and 48L two times as a pair, i.e. pairwise, wherein the cutting edges of the pair 48R/48L are oppositely directed in the peripheral direction.

Right side spectacle lens 1R is machined by means of tool head 30 in the same manner as described above with regard to FIG. 1. When doing so, a first direction of rotation Φ is set for the rotation of spectacle lens 1R, for example, a clockwise direction in a top plan view on surface 2. Insofar, lathing tool 48R is used.

For the machining of left side spectacle lens 1L one proceeds in the same manner, however, while setting an opposite direction of rotation −Φ during lathing, being a counter-clockwise direction in the above given example. Insofar, the oppositely directed cutting edge of lathing tool 48L of pair 48R/48L is used.

Second pair 70R/70L may be of another design as compared to pair 48R/48L, for machining lenses from another material, for example. However, it may also be of same design in order to be exchanged in the event that pair 48R/48L becomes worn out or damaged.

Figure 4A:
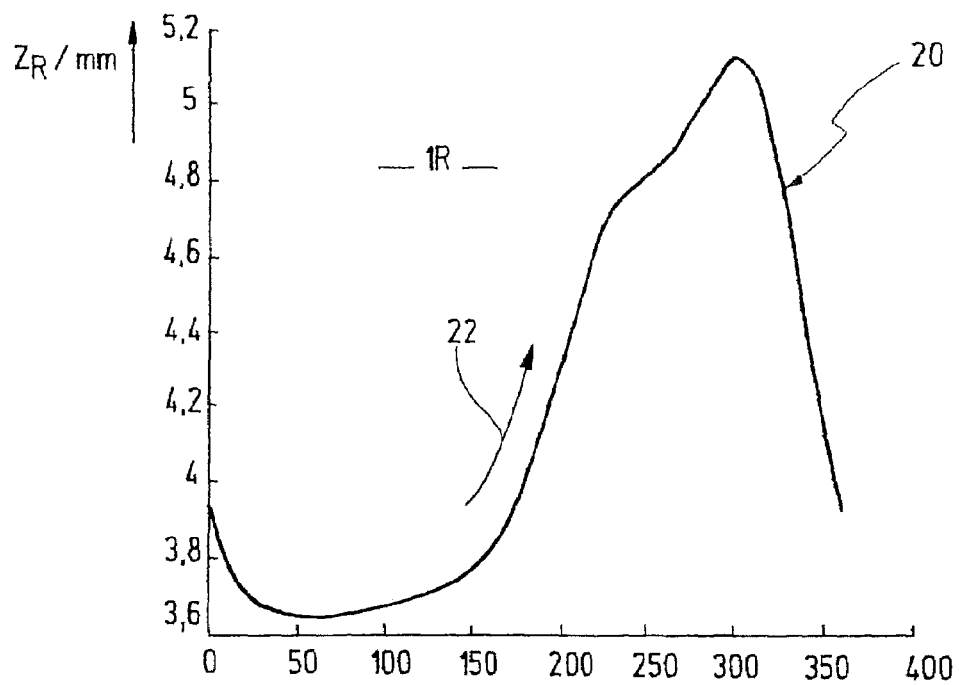
FIG. 4A shows an elevation function for one turn for a right side spectacle lens to be machined according to the invention.
Figure 4B:
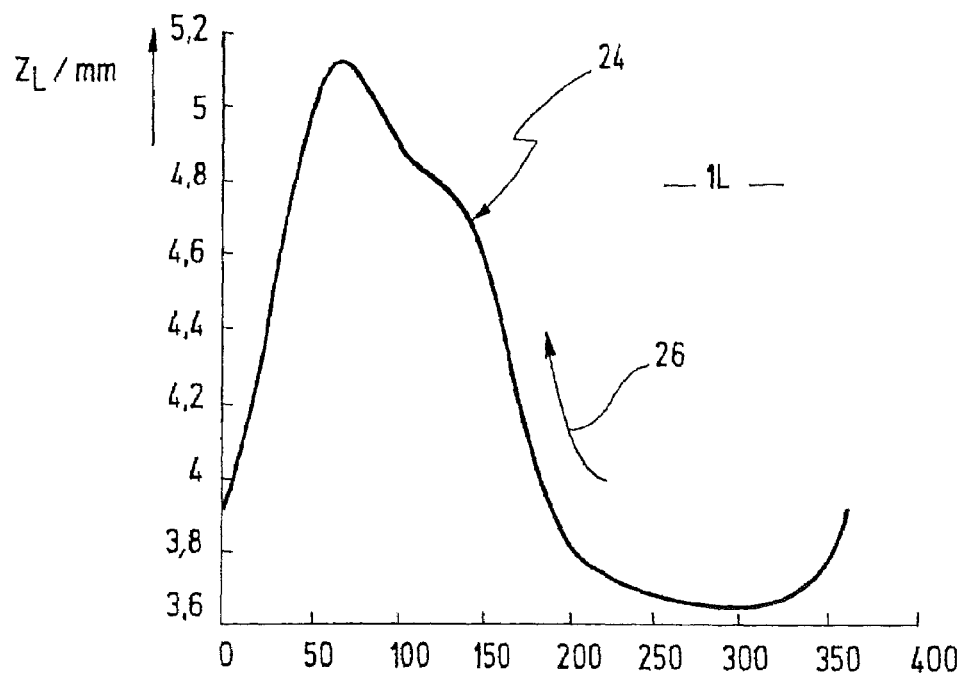
FIG. 4B shows an elevation function for one turn for a left side spectacle lens, having the same optical power as that of FIG. 4A, to be machined according to the invention.

FIGS. 4A and 4B illustrate the operation with the help of elevation functions of one turn for a right side and a left side spectacle lens.

One can see that first function 20, i.e. $Z_R=f(\Phi_R)$ for the right side spectacle lens is run through in an unaltered machining direction 22, whereas second function 24, i.e. $Z_L=f(\Phi_L)$ for the left side spectacle lens is run through in the opposite machining direction 26. Thereby, the sections of the functions 20, 24 having different gradients are run through in the same direction during machining. Corresponding points of elevation functions 20, 24, therefore, have same gradients of same sign in that case, such that the corresponding displacement unit is accelerated in the same manner during the machining.

The invention claimed is:

1. A method for machining pairwise symmetrical, optically effective surfaces of a right side spectacle lens and a left side spectacle lens by chip-removing,
wherein said surfaces are rotated about a first axis and are displaced along said axis, a chip-removing tool being provided, said tool being positioned and being adapted to be fed in, such that a cutting edge of said tool is guided over each said surface along a spiralled path and along an elevation function given by a shape of said respective spectacle lens, when each said spectacle lens is rotated about said first axis, wherein for machining the right side spectacle lens and the left side spectacle lens, said right side spectacle lens is rotated about said first axis in a first rotational direction, and said left side spectacle lens is rotated about said first axis in a second rotational direction opposite said first rotational direction.

2. The method of claim 1, wherein said optically effective surfaces are surfaces of progressive power spectacle lenses.

3. The method of claim 2, wherein for machining right side spectacle lenses and left side spectacle lenses of same optical power, said spectacle lenses are displaced along said first axis in a same manner.

4. The method of claim 2, wherein said chip-removing is executed by lathing.

5. The method of claim 4, wherein prior to said lathing said spectacle lenses are pre-machined by milling.

6. The method of claims 4, wherein said chip-removing tool includes a first lathing tool that is used during said lathing of said right side spectacle lens and a second lathing tool that is used during said lathing of said left side spectacle lens, said lathing tools being oppositely oriented.

7. The method of claim 6, wherein said lathing tools have a lathing cutting edge and are each adjusted with respect to a position of said respective lathing cutting edge.

8. The method of claim 7, wherein said chip-removing tool is rotatable about a second axis, and further wherein a point of engagement of the lathing cutting edge of at least one of said lathing tools is adjustable in the direction of said second axis.

9. The method of claim 7, wherein said chip-removing tool is rotatable about a second axis, and further wherein a point of engagement of the lathing cutting edge of at least one of said lathing tools is adjustable in a direction perpendicular to said second axis.

10. The method of claim 6, wherein said first and second lathing tools are arranged at the periphery of a rotatable tool head at radially opposite positions.

11. The method of claim 4, wherein a first lathing tool having a point of engagement is arranged at the periphery of a tool head of the chip-removing tool.

12. The method of claim 11, wherein said tool head is rotatable about a second axis and the point of engagement of said first lathing tool is located a predetermined radial distance from said second axis.

13. The method of claim 12, wherein the tool head is maintained rotationally stationary relative to said second axis during the lathing.

14. The method of claim 13, wherein prior to said lathing, said spectacle lenses are pre-machined by milling.

15. The method of claim 14, wherein a milling tool is also arranged on the periphery of said tool head at an angularly spaced location relative to said first lathing tool.

16. The method of claim 15, wherein said milling tool has a point of engagement that is located a greater distance from said second axis than the point of engagement of said first lathing tool, and further wherein said tool head is rotated about said second axis during the milling.

17. The method of claim 16, wherein following the milling step, the tool head is rotated a finite angle about said second axis to a defined rotational position wherein the point of engagement of the first lathing tool is positioned opposite the optically effective surface of one of the spectacle lenses.

18. The method of claim 17, wherein a second lathing tool is arranged at the periphery of the tool head at a radially opposite position relative to said first lathing tool.

* * * * *